United States Patent
Vatani et al.

(10) Patent No.: US 12,325,180 B2
(45) Date of Patent: Jun. 10, 2025

(54) JETTED MATERIAL PRINTER WITH VACUUM FLUID EXTRACTION

(71) Applicant: Sakuu Corporation, San Jose, CA (US)

(72) Inventors: Morteza Vatani, Los Gatos, CA (US); Steven Zhichao Shi, Santa Clara, CA (US)

(73) Assignee: Sakuu Corporation, San Jose, CA (US)

( * ) Notice: Subject to any disclaimer, the term of this patent is extended or adjusted under 35 U.S.C. 154(b) by 308 days.

(21) Appl. No.: 18/298,225

(22) Filed: Apr. 10, 2023

(65) Prior Publication Data

US 2023/0390995 A1 Dec. 7, 2023

Related U.S. Application Data

(60) Provisional application No. 63/348,749, filed on Jun. 3, 2022.

(51) Int. Cl.
*B29C 64/112* (2017.01)
*B29C 64/209* (2017.01)
*B29C 64/35* (2017.01)
*B41J 2/18* (2006.01)

(52) U.S. Cl.
CPC .......... *B29C 64/112* (2017.08); *B29C 64/209* (2017.08); *B29C 64/35* (2017.08); *B41J 2/18* (2013.01)

(58) Field of Classification Search
CPC ..... B29C 64/112; B29C 64/209; B29C 64/35; B29C 64/223; B29C 64/245; B29C 64/336; B29C 64/393; B41J 2/18; B33Y 10/00; B33Y 30/00; B33Y 50/02; B33Y 70/00

See application file for complete search history.

(56) References Cited

U.S. PATENT DOCUMENTS

| | | | |
|---|---|---|---|
| 6,596,224 B1 * | 7/2003 | Sachs | B29C 64/112 425/84 |
| 10,155,884 B2 | 12/2018 | Kenney et al. | |
| 10,343,214 B2 | 7/2019 | Natarajan et al. | |
| 11,813,882 B2 * | 11/2023 | Irving | C09D 11/54 |
| 2004/0003741 A1 | 1/2004 | Iskra et al. | |

(Continued)

OTHER PUBLICATIONS

International Search Report and Written Opinion issued Aug. 28, 2023 in related PCT/US2023/018376 filed Apr. 12, 2023—27 pages.

*Primary Examiner* — Douglas X Rodriguez
*Assistant Examiner* — Tracey M McMillion
(74) *Attorney, Agent, or Firm* — Arman Khosraviani (57) ABSTRACT

A jetted material printing system includes a carrier substrate configured to travel along a longitudinal direction thereof, one or more printheads, each of the one or more printheads being configured to deposit an amount of material onto the carrier substrate to form a printed layer, a liquid removal device located at a first position from the one or more printheads in the longitudinal direction, and a binder conditioning device located downstream from the liquid removal device in the longitudinal direction and over the carrier substrate. A method of jetted material printing includes depositing material from one or more printheads onto a carrier substrate, the material including at least a powder, a binder and a solvent, removing the solvent from the jetted material, and conditioning the jetted material.

22 Claims, 5 Drawing Sheets

(56) References Cited

U.S. PATENT DOCUMENTS

| | | | |
|---|---|---|---|
| 2016/0333153 A1* | 11/2016 | Hirata | B29C 64/153 |
| 2018/0071819 A1* | 3/2018 | Connor | B22F 10/10 |
| 2019/0054527 A1 | 2/2019 | Natarajan et al. | |
| 2019/0211424 A1 | 7/2019 | De Flon | |
| 2020/0361144 A1 | 11/2020 | Conner et al. | |
| 2021/0154925 A1 | 5/2021 | Rogren | |
| 2021/0237160 A1* | 8/2021 | Barbati | B33Y 10/00 |
| 2021/0379821 A1* | 12/2021 | Rogren | B29C 64/147 |
| 2022/0062999 A1 | 3/2022 | Schodin et al. | |

* cited by examiner

JETTED MATERIAL PRINTER WITH VACUUM FLUID EXTRACTION

TECHNICAL FIELD

Various implementations relate to restoring the properties of a printed material layer which includes a liquid, after extraction of a solvent in the printed material. Various implementations also relate to a system configured to enable fast material jetting, removal of jetted liquids and application of a restoring binder to the printed material layer.

BACKGROUND

Material jetting is an inkjet printing process whereby printheads, e.g., inkjet printheads, are used to deposit a liquid material onto a build platform in a layer-upon-layer fashion. Material jetting typically uses a UV light, to solidify the material after printing. The methods of material deposition may vary from printer to printer, and may involve either a continuous or drop-on-demand jetting approach. In some systems the printing ink or jetted material is preheated for better viscosity. In others, preheating is not required beforehand, the printhead begins to move above the build platform, depositing the first layer of material where required. The deposited material may then be exposed to UV light to cure or solidify the layer of the deposited material in a process known as photopolymerization. Once the first layer has solidified, the process of depositing another layer is repeated until the part is finished.

The jetted material typically includes a liquid vehicle comprising binding agents as well as solvents and possibly additives. The binding agents serve the purpose of holding the jetted material together. The liquid vehicle may be used with a powder to form the jetted material. The binding agents may be partially removed to increase the density of the powder and to improve the quality of the printed material before the jetted material is exposed to heat during, e.g., sintering. There is a balance of selectively removing enough of the binder from the jetted material to allow fast sintering at high heat, but not so much that the fragile parts may lose their dimensional accuracy or fall apart during the process.

Continuous material jetting typically allows for high-speed 3D printing. However, the existence of the solvent in the jetted material, which is added to lower the viscosity of the jetted material and stabilize the dispersion of particles in the ink, may dilute the powder and cause the 3D printing process to become slow. Accordingly, the solvent is removed after the material jetting to reduce dilution of the powder and increase the packing density of the jetted material. Removal of the solvent is typically performed in one of two (2) ways: thermal removal or vacuum removal or a combination of both. Thermal removal reduces the speed of the overall printing process, because of the time needed to evaporate the solvent without curing the binder that is present in the jetted material. Vacuum removal is typically faster than thermal removal. However, during vacuum removal, in addition to the solvent, the powder, the binder and any additives that may be present in the jetted material may also be removed. As a result, the quality of the printed material may deteriorate.

Hence, a need remains for a system and method for efficient removal of a solvent from a printed material layer and for restoring the properties of the printed material layer after extraction of the solvent and other liquids in the printed material.

SUMMARY

In one general aspect, the instant disclosure describes a jetted material printing system that includes a carrier substrate configured to travel along a longitudinal direction; one or more printheads, each of the one or more printheads being configured to deposit an amount of material onto the carrier substrate to form a printed layer; a liquid removal device located at a first position from the one or more printheads in the longitudinal direction, the liquid removal device being configured to remove a liquid from the printed layer formed onto the carrier substrate; and a binder conditioning device located at a second position downstream from the liquid removal device in the longitudinal direction, the binder conditioning device being configured to inject a binder material into the printed layer formed on the carrier substrate after the liquid removal.

The above general aspect may include one or more of the following features. For example, the material jetted from at least one of the one or more printheads includes at least one of: a powder; a binder; a solvent; and one or more additives. In another example, the binder material deposited onto the carrier substrate compensates for an amount of the binder that has been removed by the liquid removal device. In yet another example, wherein the binder conditioning device is configured to add an amount of the binder material to the material deposited onto the carrier substrate in order to restore one or more properties of the deposited material.

As an additional example, the jetted material printing system includes one or more sensors to determine at least one of a quantity and a location of conditioning binder required to restore one or more properties of the material deposited. In a further example, the liquid removal device is located offset from the carrier substrate, and the binder conditioning device is located offset from the carrier substrate. In a different example, the liquid removal device comprises a semi-permeable membrane.

For another example, the jetted material printing system includes a recycling system for recycling the removed liquid. In a further example, the liquid removal device and the one or more printheads are located on opposite sides of the carrier substrate. In yet another example, the first position includes a position being offset from the carrier substrate, a position downstream from the printheads, or a position substantially beneath at least one of the printheads.

In another general aspect, the instant disclosure describes a method of jetted material printing including jetting a material from one or more printheads onto a carrier substrate to form a printed layer, the material including at least one of a powder, a solvent, a binder, and one or more additives; removing at least the solvent from the printed layer via a liquid removal device; and conditioning the printed layer by dispensing an amount of conditioning binder on the printed layer formed on the carrier substrate after the solvent removal via a binder conditioning device.

The above method of jetted material printing may include one or more of the following features. In an example, depositing the material from the one or more printheads includes depositing a different material from each of the one or more printheads. In another example, the method of jetted material printing may also include using one or more sensors to determine at least one of a quantity and a location of conditioning binder required to restore one or more properties of the printed layer to its state prior to liquid removal.

In a further example, the method of jetted material printing also includes determining that transferring the binder conditioned printed layer can be transferred in its entirety without breaking; and upon determining that the binder conditioned printed layer can be transferred in its entirety without breaking, transferring the binder conditioned printed layer. In an additional example, the method includes determining that the binder conditioned printed layer cannot be transferred in its entirety without breaking, and upon determining that the binder conditioned printed layer cannot be transferred in its entirety without breaking, disposing of the binder conditioned printed layer.

For another example, dispensing the amount of conditioning binder includes depositing one or more layers of the conditioning binder or replenishing the binder in the printed layer. In another example, the method of jetted material printing also includes recycling the removed liquid. In a further example, depositing the amount of conditioning binder includes depositing a conditioning binder that is different from the binder in at least one of the one or more printheads. In yet another example, depositing the material from the one or more printheads comprises depositing the material from one or more inkjet printheads. In one other example, the one or more printheads jet the amount of material substantially in parallel with the liquid removal device removing liquid from a previously deposited material on the carrier substrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Additional advantages and novel features of these various implementations will be set forth in part in the description that follows, and in part will become more apparent to those skilled in the art upon examination of the following or upon learning by practice of the invention.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Inkjet ink may be low in viscosity, e.g., no more than about 100 centipoise, which results in a low loading of insoluble materials such as metals, ceramics or polymers (persistent and fugitive materials), suspended in a low viscosity liquid. Typically, the volumetric loading of insoluble materials in ink jet ink is 20% or less. Binders may make up 5% to 20% of the total volume of the ink, leaving 60% to 75% or more as solvent or other components of the liquid vehicle, which may have to be removed in order to achieve a practical density of materials prior to curing, or green density, of at least 40% by volume of the active materials. The liquid vehicle comprises at least one or more of a binder or binding agent, a solvent and additives. Inkjet printers can be used with inks that are comprised of materials that may be polymerized to a solid mass after deposition. This may be useful for making parts that are comprised largely of organic materials. While it may be possible to formulate virtually 100% polymerizable material that may be jetted, inks or jetted material that include a solid material, e.g., inorganic materials like a ceramic powder, commonly may not exceed about 20% by volume of the solid material. Therefore, if inkjet printers are to be practical for high-speed 3D printing, it would be advantageous to provide a mechanism for removing the majority of the solvent in the liquid vehicle deposited during the printing cycle more rapidly than can be accomplished by evaporation alone.

Removing solvent during material jetting presents a technical problem because removal of the solvent using a pressure differential or vacuum may cause other components of the jetted material such as, binders, powder and/or additives, to also be removed. Removal of binders, powder and/or additives may be deleterious to the quality of the jetted material layer or printed layer.

To address these technical problems and more, in an example, this description provides a technical solution for removing the solvent by applying a pressure differential, or vacuum, that does not adversely affect the quality of the jetted material layer or printed layer. Specifically, various implementations include adding a binder deposition device, or binder deposition step, that follows a solvent removal process so as to replenish other components of the jetted material such as, the binder that may have been removed together with the solvent.

Various implementations include printing a material layer via, e.g., jetting, on a carrier substrate from a printhead such as an inkjet printhead. The printed layer, which may include the powder or material to be printed, a binder, a solvent and possibly one or more additives, is referred to herein as ink, or jetted material. Printing of the jetted material may be followed by liquid solvent extraction such as, a solvent extraction based on applying a pressure-differential, or a vacuum, to the printed layer. Such solvent extraction may be referred to herein as vacuum-based solvent extraction. The liquid solvent extraction may remove most or all of the liquid present in the printed layer. The printed layer may include one type of material, or multiple types of material when there are multiple printheads jetting the material to be printed on the same carrier substrate. For example, the number of different types of materials being deposited may depend on the number of printheads used to jet the material on the same carrier substrate in order to form the printed layer.

In various implementations, the vacuum-based solvent extraction that follows the deposition of the printed layer may result in a printed layer that has less solvent, but also less binder. For example, removing liquids such as, the solvent, from the printed layer may be accomplished by depositing the printed layer on a semi-permeable membrane that includes a plurality of apertures. As discussed above, removal of the solvent using vacuum extraction may cause the loss of some jetted material, such as the binder, that may be needed to preserve the properties of the printed layer or layers, for example, mechanical properties. Accordingly, after liquids are removed from the printed layer via, e.g., vacuum removal, a binder conditioning device may be used to deposit or dispense an amount of binder on top of the printed layer in order to replenish the printed layer with binder so as to preserve the quality and integrity of the printed layer. In some implementations, a conditioning binder jet, or binder conditioning device may thus be added to the continuous material jetting system, the conditioning binder jet being configured to add an amount of binder to the printed layer in order to restore one or more properties of the printed layer. These properties include, but are not limited to, properties which enable a printed layer to be securely bonded across its surface to another printed layer, for example density, powder loading, binder-loading and/or additive loading. The conditioning binder jet may also be chosen so as to facilitate stacking of layers. Accordingly, it becomes possible to use vacuum-based solvent extraction from a printed layer while maintaining a desired level of binder in the deposited material.

Figure 1:
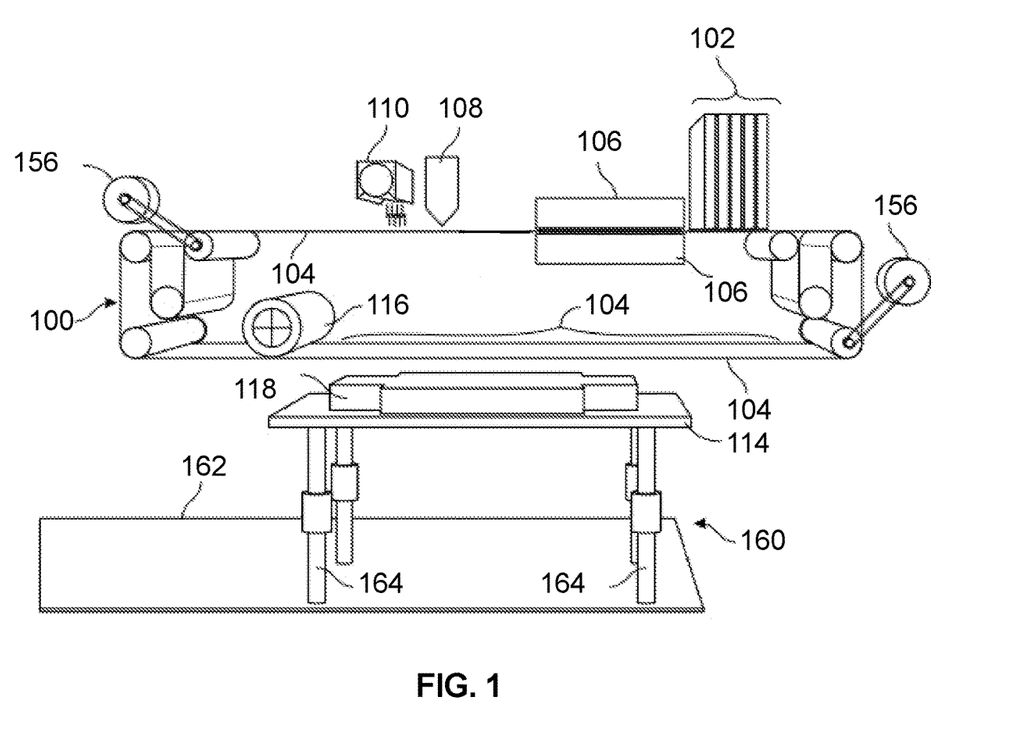
FIG. 1 illustrates a diagram representation of a 3D printing apparatus, according to various implementations.

FIG. 1 illustrates a schematic representation of a 3D printing apparatus 100, according to various implementations. In the 3D printing apparatus 100, deposition of a printed or patterned layer starts by depositing inkjet inks (inkjet material) appropriate with each of one or more inkjet printheads 102 onto a carrier 104 (also referred to herein as receiver device 104 or receiver 104), which is depicted in FIG. 1 as a continuous belt. In other implementations, carrier 104 may take other forms, such as individual carrier plates or an extended length of carrier material that may be cycled through the printer one time before being reconditioned or disposed of.

Each one of the plurality of inkjet printheads 102 may be configured to deposit ink in a predetermined pattern of a printed layer according to, e.g., instructions received from a print station controller, as further described below in connection with FIGS. 4 and 5. Each of the plurality of inkjet material printheads 102 may be supplied with inkjet ink containing a same or different material, each material conforming to a desired physical specification. The plurality of printheads 102 may all be of the same type, or each of the plurality of printheads 102 may be of a type that is different from one or more of the other printheads 102. Printheads 102 may be configured to print directly on the carrier 104 in order to create a printed layer thereon, or onto a substrate or permeable membrane placed on the carrier 104, as further discussed below.

In various implementations, each one of printheads 102 deposits a predetermined quantity of inkjet ink onto the carrier 104 in a desired pattern of voxels, as directed by a print station controller described below in connection with FIG. 5. Each of the voxel patterns of each one of the plurality of printheads 102 may be separated from the voxel patterns from any other printheads 102, or may partially or completely overlap the voxel pattern of any other one, or all of, the rest of the printheads 102. The result may be a printed layer of a desired pattern of a plurality of ink types on the carrier 104. It will be understood that a pattern of ink may not cover 100% of carrier 104, depending on the part to be printed and any subsequent processing of the layer.

In various implementations, the portion of the carrier 104 that is under the printheads 102 may move the printed layer in a direction of travel, illustrated in FIG. 1 as being from right to left, using printer drive motor 156 such that the printed layer may be juxtaposed with liquid extraction device 106. This may be achieved by provisioning the carrier 104 with the printer drive motor 156 such that, under control of a print station control unit, the carrier 104 may move in a direction of travel. The liquid extraction device 106 may then operate to cause low viscosity constituents of ink making up the printed layer to be removed from the printed layer, thereby drying or partially drying the printed layer.

In various implementations, the liquid extraction device 106 may comprise a vacuum. In some implementations, the liquid extraction device 106 may comprise a porous membrane placed on the carrier 104, which is mostly permeable to the solvent to be removed. For example, the substrate may be configured such that the pore size, surface chemistry and other parameters regulate the liquid that passes through the pores, and ensure that the solid particles which make up the printed layer remain on the carrier 104. The porous membrane may comprise a plurality of apertures of a uniform pore size or variable pore sizes.

In various implementations, the carrier 104 may further move the printed layer in the direction of travel such that the printed layer may be juxtaposed with binder conditioning device 108. For example, the binder conditioning device 108 is configured to add an amount of binder to compensate for any amount that has been removed by the liquid extraction device 106. Before or after conditioning the printed layer by the binder conditioning device, the carrier 104 may also move the printed layer to a fixing device 110 to cure or solidify the layer.

In various implementations, after the printed layer has been dried and conditioned and/or cured as discussed above, the carrier 104 may move the printed layer to build plate 114, where transfer device 116 may be used to transfer the printed layer to build plate 114. As used herein, a "transfer device" includes any apparatus for moving the printed layer to an assembly apparatus. The first printed layer may be transferred directly to build plate 114, while subsequent printed layers may be placed atop the first printed layer to create a stack of printed layers 118.

In an implementation, the plurality of printheads 102 may be positioned such that the nozzles of each one of the plurality of printheads 102 form one or more substantially straight lines, and that the straight lines of the nozzles in all of the plurality of printheads 102 are juxtaposed parallel to each other. The plurality of printheads 102 may be aligned such that the parallel rows of nozzles are aligned perpendicularly to the direction of travel of the carrier 104, and that the nozzles may extend up to substantially the full width of the carrier 104. The plurality of printheads 102 may be provisioned with a transport device to allow the plurality of printheads 102 to traverse a length of carrier 104 to create a predetermined pattern of voxels on carrier 104.

In various implementations, the plurality of printheads 102 may be fixed across the width of carrier 104, and the carrier 104 may be configured to move in a direction of travel such that the plurality of printheads 102 may deposit a predetermined pattern of ink, in voxels, on a length of carrier 104. In other examples, the parallel rows of nozzles may be aligned parallel to the direction of movement of the carrier 104. In such a case, the plurality of printheads 102 may be provisioned with a transport device (not shown) to allow the plurality of printheads 102 to traverse the width of the carrier 104 to create a predetermined pattern of a plurality of inks, in voxels, on the carrier 104. Whatever the configuration of printheads 102, they may collectively deposit a layer of ink which is referred to herein as the printed layer.

In various implementations, the carrier 104 may move the printed layer to a liquid extraction device 106, where a pressure differential may be used to remove solvents or unwanted liquids from the printed layer. By moving the printed layer away from printheads 102 before removing the liquids, the 3D printer may print another printed layer via the printheads 102 in parallel with the liquid removal process of the previously printed layer. For example, the liquid extraction device 106 may include a vacuum chamber, which may include a vacuum tight enclosure. In some implementations, the liquid extraction device 106 may also be provided with a connection to a vacuum source (not shown). In some implementations, instead of, or in addition to, applying a vacuum to the bottom of the printed layer, a solvent extraction system may apply a pressure differential by applying a positive pressure to a top surface of the printed layer.

In various implementations, after the printed layer has been deposited, it may include a substantial amount of low viscosity liquid, for example as much as 90% by volume. After the printed layer has been positioned in contact with the liquid extraction device 106, solvent may be evacuated by an attached vacuum source to create a pressure differential across the printed layer. The pressure differential across the printed layer may cause a substantial amount (for example as much as 90%) of the low viscosity liquid in the layer to be forced into the vacuum chamber, thereby transforming the printed layer into a dried layer or partially dried layer.

In various implementations, an assembly apparatus 162 may include a build station 160 comprising an X-Y-Z positioner device 164. As used herein, the term "assembly apparatus" may refer to any system capable of receiving printed layers 118 from a plurality of transfer devices 116 in such a way as to assemble printed layers and finished parts according to a predetermined design. The build station 160 may include a build plate 114. The X-Y-Z positioner device 164 may be able to adjust the vertical position of the build plate 114 to maintain the top of the previously transferred printed layers 118 at a predetermined vertical position to facilitate proper transfer of a printed layer to the build plate 114 or the top of a stack of previously transferred printed layers 118.

In one implementation, the binder conditioning device 108 may be located downstream from the liquid extraction device 106 along the direction of travel of the carrier 104. The binder conditioning device 108 may be configured to inject more binder in the printed material deposited on the carrier substrate 104, to account for any binder that may have been removed/reduced by the fluid removal device. In this manner, the 3D printing system can maintain the quality of the printed layer.

Figure 2A:
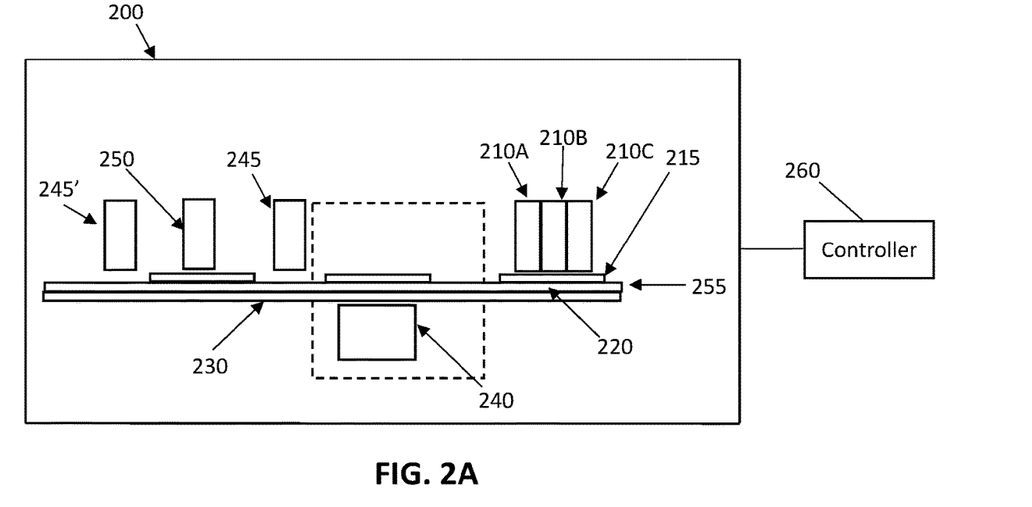
FIG. 2A depicts a 3D printing apparatus including a binder conditioning device, according to various implementations.

FIG. 2A depicts a jetted material printing system. The 3D printing apparatus 200 includes a binder conditioning device. The 3D printing apparatus 200 includes a plurality of printheads 210A, 210B and 210C, a liquid removal device 240, and a binder conditioning device 250. In some implementations, operation of the printheads 210A, 210B and 210C, the liquid removal device 240, and the binder conditioning device 250 may be controlled by controller 260, the operation and configuration of which are further discussed in connection with FIG. 5 below. In the 3D printing apparatus 200, the plurality of printheads 210A, 210B and 210C jet an amount of material 215 onto a carrier substrate 220, the jetted material 215 coming from an ink or a slurry included in each of the printheads 210A, 210B and 210C. For example, each of the printheads 210A, 210B and 210C, which may be inkjet printheads, may contain a slurry that includes any combination of a powder, a solvent, a binder and one or more additives, and may be configured to jet the material 215 from that slurry onto the carrier substrate 220. The slurries contained in the printheads 210A, 210B and 210C may be different from each other. Accordingly, the amounts, concentrations and nature of the powders, solvents, binders and additives included in the slurry in each of the printheads 210A, 210B and 210C may be different for each printhead. Optionally, the amounts, concentrations and nature of the powders, solvents, binders and additives included in the slurry in each of the printheads 210A, 210B and 210C may be the same.

When a plurality of printheads, such as printheads 210A, 210B and 210C, simultaneously or contemporaneously jet a material 215 onto the carrier substrate 220 disposed on a moving platform 230, the resulting layer of deposited jetted material 215 may be a combination of the materials included in each of the printheads 210A, 210B and 210C. With reference to FIG. 1, the system 200 in FIG. 2A corresponds to the combination of elements 102, 104, 106, and 108. Specifically, the printheads 210A, 210B and 210C may correspond to the inkjet printheads 102, the carrier substrate 220 may correspond to the carrier 104, the liquid removal device 240 may correspond to the liquid extraction device 106, and the binder conditioning device 250 may correspond to the binder conditioning device 108.

In various implementations, the moving platform 230 which holds the carrier substrate 220 is configured to travel along a longitudinal direction of travel 255 thereof, and as the carrier substrate 220 travels away from the printheads 210A, 210B and 210C on the moving platform 230, the carrier substrate 220 may come to a liquid removal device 240. The liquid removal device 240 may be located at a first position, wherein in one example the first position is offset from the carrier substrate, in another example, the first position is downstream from the printheads 210A, 210B and 210C, and in a further example, the first position is substantially beneath at least one of the printheads 210A, 210B and 210C. In some implementations, the liquid removal device 240 may be located under the carrier substrate 220, or on an opposite side of the carrier substrate 220 from the printheads 201A, 210B and 210C. The liquid removal device 240 may be configured to remove liquids such as, e.g., a solvent, from the jetted material 215 deposited on the carrier substrate 220. The liquid removal device 240 may be configured to remove the liquids by using, e.g., a pressure differential or vacuum. For example, the liquid removal device 240 may include a vacuum generator and may be configured to remove the solvent from the material 215 that has been jetted onto the carrier substrate 220 via a sucking action generated by the pressure differential or via a vacuum generated by the liquid removal device 240.

In some cases, removing solvent form the jetted material 215 via pressure differential or vacuum may cause any one or more of the other components of the jetted material 215 such as, any combination of the solvent, the binders and the additives, to also be removed from the jetted material 215. Accordingly, in various implementations, the jetted material 215 is moved by the moving platform 230 to a binder conditioning device 250 located downstream from the liquid removal device 240. The binder conditioning device 250 may be configured to inject more binder in the jetted material 215 deposited on the carrier substrate 220, and as a result replenish any binder that may have been removed/reduced by the liquid removal device and thus to maintain the quality of the printed material 215. The binder conditioning device 250 may be located at a second position offset from the carrier substrate and downstream from the liquid removal device along a direction of travel 255 thereof, and may inject the same binders as were initially present in each of the printheads 210A, 210B and 210C. The binder conditioning device 250 may be located over or above the carrier substrate 220, or on an opposite side of the carrier substrate 220, i.e. the opposite side of the jetted material 215 from the printheads 210A, 210B and 210C. The binder conditioning device 250 may also inject one or more combination of binders that are different from the binders that were initially present in each of the printheads 210A, 210B and 210C. The binder conditioning device 250 may inject the binder or binders using printheads, e.g., similar to the printheads 210A, 210B or 210C. Accordingly, any binder that may have been removed from the jetted material 215 by the vacuum or pressure differential during operation of the liquid removal device 240 may be replenished partially or completely. For example, additional binder is added until reaching to the same level of binder loading of the jetted material 215 as the level prior to the liquid removal. As a result, the jetted material 215 may regain a desired or acceptable binder loading and restore overall quality that may have been adversely affected during operation of the vacuum-based liquid removal device 240.

Figure 2B:
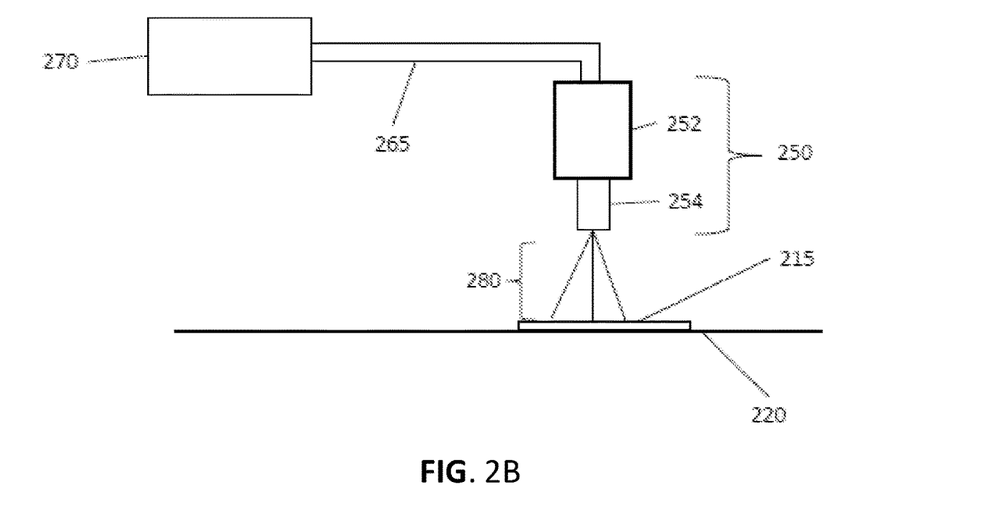
FIG. 2B depicts a binder conditioning device, according to various implementations.

FIG. 2B depicts a binder conditioning device 250, according to various implementations. In FIG. 2B, the binder conditioning device 250 includes a body 252 and a nozzle 254. The body 252 is connected to a reservoir 270 via a conduit 265. The reservoir 270 may be replenishable and may be configured to store a binder to be provided to the body 252. During operation of the binder conditioning device 250, the binder may flow from the reservoir 270 to the body 252 via the conduit 265, and the nozzle 254 may discharge the binder 280, in the form of a spray, onto the jetted material 215. Accordingly, any binder that may have been initially removed by the liquid removal device 240 may be replenished by the binder conditioning device 250.

In various implementations, the binder 280 may be discharged on the jetted material 215 one layer at a time. For example, a single layer of binder 280 may be discharged on the jetted material 215, and the deposition of the single layer of binder 280 may constitute sufficient conditioning of the jetted material 215. The layer of binder 280 may have the same thickness as that of a single layer of the jetted material 215. Alternatively, several layers of binder 280 may be discharged on the jetted material 215 to constitute sufficient binder conditioning of the jetted material.

The quantity and/or location of conditioning binder required to restore one or more properties of the printed layer (e.g. the jetted material 215) by the binder conditioning device 250 may be determined by a sensor 245 located between the liquid removal device 240 and the binder conditioning device 250 (e.g., see FIG. 2A) based on whether the printed layer has a sufficient amount of binder so that the printed layer can be adequately transferred to the build plate in a manner that enables a printed part to be assembled. If desired, another sensor 245' can be located to re-check the quantity of the binder in the printed layer, i.e. the conditioned printed layer, following the conditioning binder having been applied by the binder conditioning device 250.

For example, determining whether the conditioned printed layer post the binder conditioning, can be adequately transferred may comprise determining if all the materials forming the printed layer have bonded together, and the printed layer can be transferred as a whole and in its entirety without breaking. This may comprise determining the structural integrity and mechanical strength of the layer, for example by stress testing, hardness testing, adhesion testing, or other methods known to those skilled in the art. Any printed layer that has been subjected to the same quantity and/or location of conditioning binder by binder conditioning device 108, but cannot be adequately transferred by the transfer device 116, is disposed of. The quantity and/or location of conditioning binder is then modified. Once transfer is confirmed to be adequate, any printed layer that has been subjected to the same quantity and/or location of conditioning binder by binder conditioning device 108 can continue to be transferred by transfer device 116. In some implementations, the location may comprise a location in the x, y and/or z dimension.

In various implementations, determining the quantity and/or location of liquid to be removed, or the quantity and/or location of conditioning binder required to restore one or more properties of the printed layer to its state prior to liquid removal may comprise using one or more sensors. Various types of sensors including optical, gravimetric, capacitive, resistive, piezoresistive, electrochemical, micro-electro-mechanical-system and field-effect-transistor sensors may be used.

For example, sensor(s) such as described in U.S. patent application Ser. No. 18/074,341, "Wetting Sensor, Method and System for Sensing an Amount of a Wetting Agent", filed Dec. 2, 2022, which is hereby incorporated by reference, can be used as the sensors 245 and 245' in FIG. 2A to determine the amount of liquid which has been removed and/or the amount of conditioning binder to be added to compensate for any amount that has been removed by the liquid extraction device 106. These sensors can enable automated in-line monitors to detect quality issues related to wetting, drying and deposition/removal of wetting agents such as steam, liquid binders and inkjet materials in real time, thus minimizing production of defective printed layers. For example, in one implementation, a wetting agent absorbing material (or sensing material) can be used to absorb a wetting agent forming a wetting agent absorbing material/wetting agent mixture, which interacts with sensing electrodes of a sensor and generates an electrical sensing signal that is proportional to the concentration of the wetting agent absorbed in the wetting agent absorbing material. It is noted that the sensors 245 and 245' can be located to detect the amount of a binder in the actual layer being processed, or, alternatively, to detect the amount of the binder in a test sample layer (for example in a reservoir located adjacent to the actual layer being processed) that is being subjected to the same processing steps as the actual layer being processed, as also described in U.S. patent application Ser. No. 18/074,341.

Figure 2C:
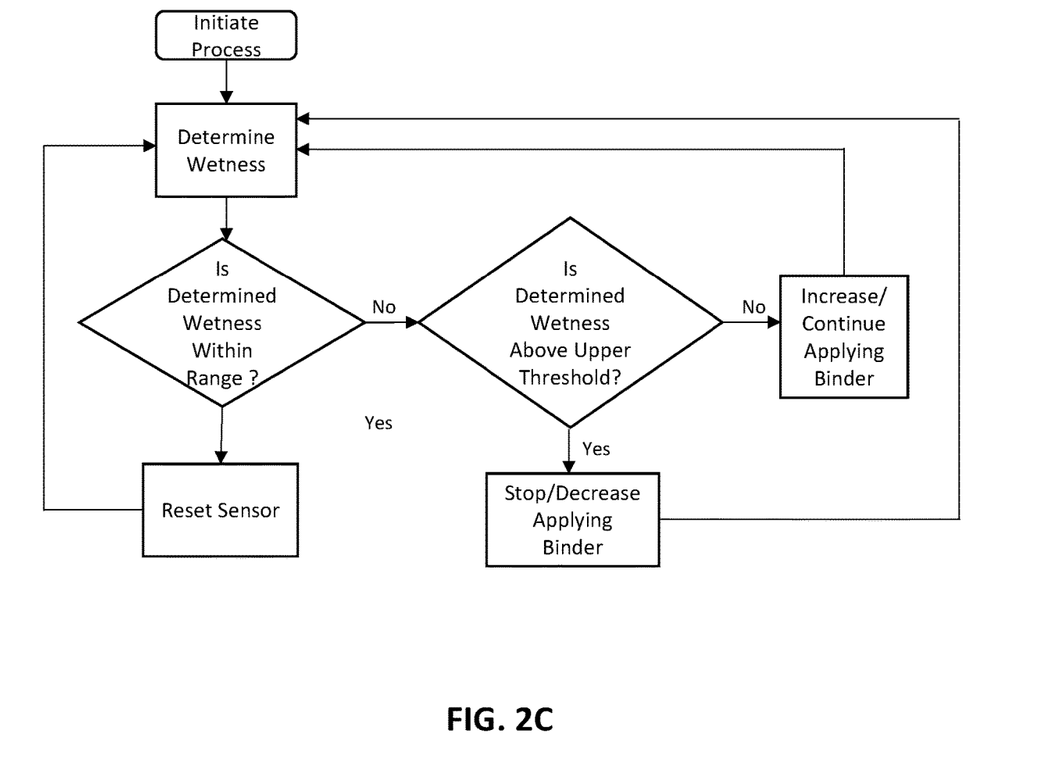
FIG. 2C illustrates a basic methodology showing incorporation of the sensors into the 3D printing apparatus, according to various implementations.

In implementations for sensing the amount binder remaining in the layer following liquid extraction by the liquid extraction device 106, and, correspondingly to determine how much conditioning binder needs to be added by the binder conditioning device 250, the incorporation of one or more wetting sensors 245/245' may be utilized to detect liquid binder at various depths and locations of a printed layer, thus providing real-time monitoring of binder deposition process and quality. As illustrated in FIG. 2c, the wetting sensors described herein can begin a control operation by first determining wetness of a material being monitored, for example, a powder/wetting agent mixture, e.g., the printed layer or jetted material layer 215. In this case, the "Initiate Process" step prior to the control operation, i.e. the binder conditioning operation, could actually be a step of material jetting which would, itself, inject an ink (liquid material or jetted material) to create a powder/wetting agent mixture (with the liquid binder material being the wetting agent). If the one or more wetting sensors determines that the degree of wetness of the powder/liquid binder mixture falls within a predetermined acceptable range, then it is determined that the binder conditioning process is complete. The powder/binder mixture being monitored can continue to the next step of processing such as further drying and/or curing.

Figure 3:
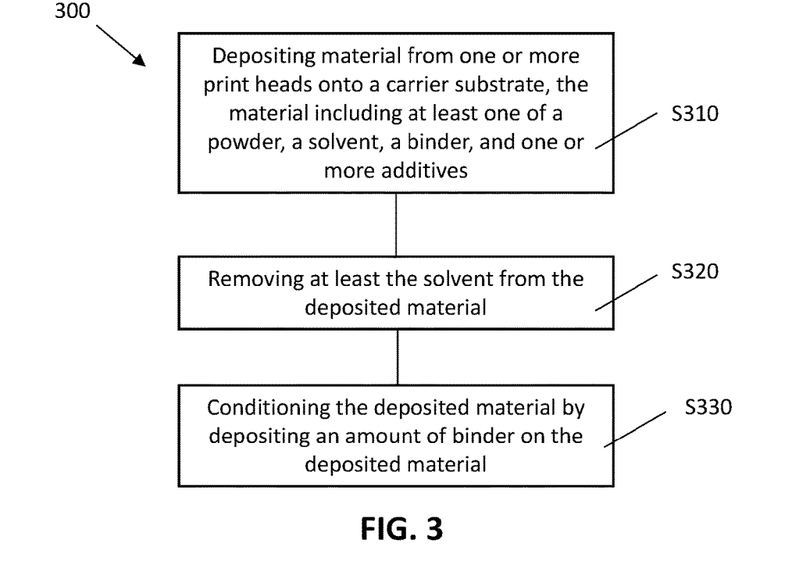
FIG. 3 illustrates a method of conditioning a printed material by adding binder material to a jetted material, according to various implementations.

FIG. 3 illustrates a method of conditioning a printed material by adding binder material to a jetted material, according to various implementations. In FIG. 3, the method 300 starts at S310, by depositing or jetting material from one or more printheads onto a carrier substrate, the jetted or deposited material including at least a powder, a solvent, a binder and one or more additives. With reference to FIGS. 2A and 2B, the material 215 is jetted from the printheads 210A, 210B and/or 210C onto a carrier substrate 220, and the carrier substrate 220 is on the moving platform 230. Depositing or jetting the material from the printheads may include jetting an ink or a slurry including a combination of a powder, a binder, and a solvent from each of the printheads. The slurry in any of the printheads may also include one or more additives. In some implementations, jetting the material from the slurry included in the printheads includes jetting the slurry from one or more inkjet printheads such as, e.g., inkjet printheads 210A, 210B and 210C illustrated in FIG. 2A.

In various implementations, at S320, the method 300 may proceed to remove at least the solvent from the jetted material. Removing the solvent from the jetted material may include applying a pressure differential or vacuum to the jetted material on the carrier substrate. With reference to FIGS. 2A and 2B, removing the solvent may be performed via the liquid removal device 240 which is configured to apply a pressure differential or vacuum onto the carrier substrate 220, when the carrier substrate 220 on which the jetted material 215 is deposited is moved from the printheads 210A, 210B and 210C to the liquid removal device 240 via the moving platform 230.

In one implementation, the method additionally comprises an in-situ recycling system, the recycling system enabling recovery, reconditioning and/or reuse of the removed liquid. In some configurations, the recovered liquid may be fed directly back and used by the printing system. In some implementations, the recovered liquid is collected and stored in a container before being fed back to re-use without any reconditioning. When multiple printing stations or systems are employed, the recovered liquid from each printing station or system is collected mixed and stored in a container, the mixed liquid in the container is fed back for reuse by one or more of the multiple printing stations. In some implementations, the recovered liquid is blended with virgin liquid comprising the jetted material before being fed back to reuse. In some implementations, chemical composition analysis is performed on the recovered liquid to determine if reconditioning or regeneration is required to restore the composition of the liquid. In some implementations, the recovered liquid is regenerated by replenishing the components that are consumed in the printing process.

In various implementations, at S330, the method 300 may further proceed to condition the jetted or deposited material, i.e., the printed layer. Conditioning the jetted material may include adding one or more binder materials or conditioning binders to the jetted material to restore an acceptable amount of binder loading of the printed material, which increases the quality of the printed material. With reference to FIGS. 2A and 2B, conditioning the jetted material 215 may be accomplished by depositing an amount of the conditioning binder on the jetted material 215 via the binder conditioning device 250. The binder conditioning device 250 may be configured to add one or more conditioning binders on the jetted material or printed layer 215 formed on the carrier substrate 220, when the carrier substrate 220 is transported from the liquid removal device 240 to the binder conditioning device 250. In some implementations, adding the one or more conditioning binders during S330 may include adding a conditioning binder that is similar to the binder present in each of the printheads 210A, 210B and 210C. In other examples, the conditioning binder added by the binder conditioning device 250 may be different from the binders in each of the printheads 210A, 210B and 210C.

Figure 4:
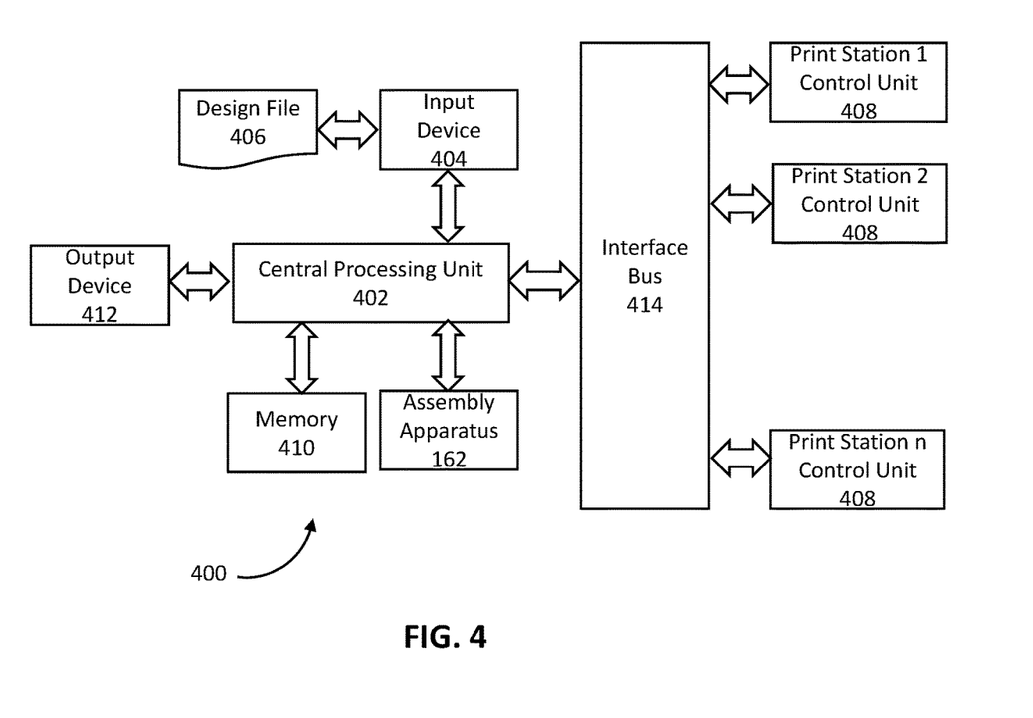
FIG. 4 is a diagram of a computer system that may control a 3D inkjet printer.

In various implementations, a computer system 400 for controlling the 3D inkjet printer illustrated in FIG. 2A is illustrated in FIG. 4. Central processing unit (CPU) 402 communicates with input device 404, which may be supplied with a design file 406. In some implementations, a user may create the design file 406 using CAD software or the like, either on a computer system 400 or on another computer. In other implementations, a user may receive a design file from a file repository, such a file-sharing site, or from a commercial vendor of 3D designs. CPU 402 may store design file 406 or intermediate calculations for control of the print station control units 408 in memory 410, and may communicate with the user via output device 412. CPU 402 may communicate through interface bus 414 with a plurality of print station control units 408 to control depositing, jetting or dispensing of ink from inkjet printheads 210A, 210B and/or 210C as discussed above and other functions of the print station control units 408. The CPU 402 may also communicate with an assembly apparatus 162 to control the process of assembling the printed layers according to a predetermined design.

Figure 5:
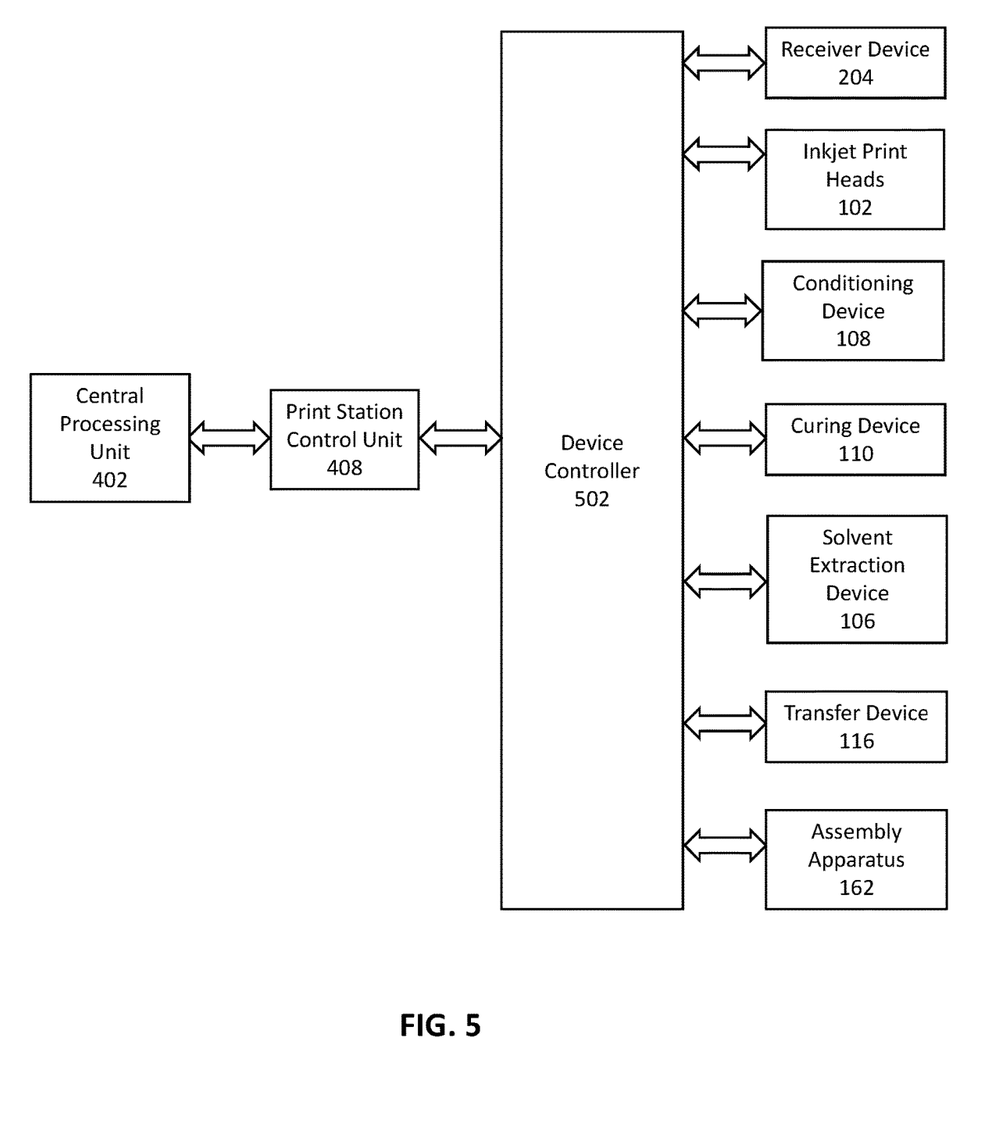
FIG. 5 is a diagram of a print station controller for use with a 3D inkjet printer.

FIG. 5 is a diagram of a print station controller for use with a 3D inkjet printer. As shown in FIG. 5, print station control units 408 may communicate via a device controller 502 with receiver device 204, inkjet printheads 102, conditioning device 108, curing device 110, liquid extraction device 106, transfer device 116, and assembly apparatus 162, controlling each of these devices in order to deposit ink as specified by the design file 406 as interpreted by CPU 402. CPU 402 may receive state information and sensor information, and may send control signals, to any of these devices using control signaling systems that are known in the art, in order to facilitate printing as described herein.

In the following, further features, characteristics and advantages of the instant application will be described via the following items:

Item 1: A jetted material printing system comprising:
  a carrier substrate configured to travel along a longitudinal direction;

one or more printheads, each of the one or more printheads being configured to deposit an amount of material onto the carrier substrate to form a printed layer;
a liquid removal device located at a first position from the one or more printheads in the longitudinal direction, the liquid removal device being configured to remove a liquid from the printed layer formed onto the carrier substrate; and
a binder conditioning device located at a second position downstream from the liquid removal device in the longitudinal direction, the binder conditioning device being configured to deposit a binder material on the printed layer formed on the carrier substrate after the liquid removal.

Item 2: The jetted material printing system of item 1, wherein the material jetted from at least one of the one or more printheads comprises at least one of:
a powder;
a binder;
a solvent; and
one or more additives.

Item 3: The jetted material printing system of items 1 or 2, wherein the printed layer comprises a binder, and wherein the binder material deposited on the printed layer formed on the carrier substrate compensates for an amount of binder that has been removed by the liquid removal device.

Item 4: The jetted material printing system of any of items 1-3, wherein the binder conditioning device is configured to add an amount of the binder material to the material deposited onto the carrier substrate in order to replenish one or more properties of the deposited material to preserve quality and integrity of the printed layer.

Item 5: The jetted material printing system of any of items 1-4, wherein the binder conditioning device is configured to add an amount of the binder material to the material deposited onto the carrier substrate in order to restore one or more properties of the deposited material.

Item 6: The jetted material printing system of any of items 1-5, further comprising one or more sensors to determine at least one of a quantity and a location of conditioning binder required to restore one or more properties of the material deposited.

Item 7: The jetted material printing system of any of items 1-6, wherein the liquid removal device is located offset from the carrier substrate, and the binder conditioning device is located offset from the carrier substrate.

Item 8: The jetted material printing system of any of items 1-7, wherein the liquid removal device comprises a semipermeable membrane.

Item 9: The jetted material printing system of any of items 1-8, further comprising a recycling system for recycling the removed liquid.

Item 10: The jetted material printing system of any of items 1-9, wherein the liquid removal device and the one or more printheads are located on opposite sides of the carrier substrate.

Item 11: The jetted material printing system of any of items 1-10, wherein the first position includes a position being offset from the carrier substrate, a position downstream from the printheads, or a position substantially beneath at least one of the printheads.

Item 12: A method of jetted material printing, the method comprising:
depositing a material from one or more printheads onto a carrier substrate to form a printed layer, the material including at least one of a powder, a solvent, a binder, and one or more additives;
removing at least the solvent from the printed layer via a liquid removal device; and
conditioning the printed layer by depositing an amount of conditioning binder on the printed layer formed on the carrier substrate after the solvent removal via a binder conditioning device.

Item 13: The method of item 12, wherein depositing the material from the one or more printheads comprises depositing a different material from each of the one or more printheads.

Item 14: The method of any of items 12 or 13, wherein further comprising using one or more sensors to determine at least one of a quantity and a location of conditioning binder required to restore one or more properties of the printed layer to its state prior to liquid removal.

Item 15: The method of any of items 12-14, further comprising:
determining that the binder conditioned printed layer has a sufficient amount of binder so that the binder conditioned printed layer can be transferred in its entirety without breaking; and
upon determining that the binder conditioned printed layer can be transferred in its entirety without breaking, transferring the binder conditioned printed layer.

Item 16: The method of any of items 12-15, further comprising:
determining that the binder conditioned printed layer fails to have a sufficient amount of binder so that the binder conditioned printed layer cannot be transferred in its entirety without breaking, and
upon determining that transferring the binder conditioned printed layer cannot be transferred in its entirety without breaking, disposing of the binder conditioned printed layer.

Item 17: The method of any of items 12-16, wherein depositing the amount of conditioning binder comprises depositing one or more layers of the conditioning binder.

Item 18: The method of any of items 12-17, wherein depositing the amount of conditioning binder comprises replenishing the binder in the printed layer.

Item 19: The method of any of items 12-18, further comprising recycling the removed liquid.

Item 20: The method of any of items 12-19, wherein depositing the amount of conditioning binder comprises depositing a conditioning binder that is different from the binder in at least one of the one or more printheads.

Item 21: The method of any of items 12-20, wherein jetting the material from the one or more printheads comprises jetting the material from one or more inkjet printheads.

Item 22: The method of any of items 12-21, wherein the one or more printheads deposit the amount of material substantially in parallel with the liquid removal device removing liquid from a previously deposited material on the carrier substrate.

Item 23: The method of any of items 12-22, wherein the printed layer comprises a binder, and wherein the conditioning binder deposited on the printed layer formed on the carrier substrate compensates for an amount of binder that has been removed by the liquid removal device.

Item 24: The method of any one of items 12-23, wherein the binder conditioning device is configured to add an amount of the conditioning binder to the material deposited onto the carrier substrate in order to replenish one or more properties of the deposited material to preserve quality and integrity of the printed layer.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A jetted material printing system, comprising:
   a carrier substrate configured to travel along a longitudinal direction;
   one or more printheads, each of the one or more printheads being configured to deposit an amount of material onto the carrier substrate to form a printed layer;
   a liquid removal device located at a first position from the one or more printheads in the longitudinal direction, the liquid removal device being configured to remove a liquid from the printed layer formed onto the carrier substrate; and
   a binder conditioning device located at a second position downstream from the liquid removal device in the longitudinal direction, the binder conditioning device being configured to deposit a binder material on the printed layer formed on the carrier substrate after the liquid removal;
   wherein the liquid removal device removes an amount of binder material from the printed layer, and wherein the binder material deposited on the printed layer formed on the carrier substrate compensates for an amount of the binder that has been removed by the liquid removal device.

2. The jetted material printing system of claim 1, wherein the material jetted from at least one of the one or more printheads comprises at least one of:
   a powder;
   a binder;
   a solvent; and
   one or more additives.

3. The jetted material printing system of claim 1, wherein the binder conditioning device is configured to add an amount of the binder material to the material deposited onto the carrier substrate in order to replenish one or more properties of the deposited material to preserve quality and integrity of the printed layer.

4. The jetted material printing system of claim 1, further comprising one or more sensors to determine at least one of a quantity and a location of conditioning binder required to restore one or more properties of the material deposited.

5. The jetted material printing system of claim 1, wherein the liquid removal device is located offset from the carrier substrate, and the binder conditioning device is located offset from the carrier substrate.

6. The jetted material printing system of claim 1, wherein the liquid removal device comprises a semi-permeable membrane.

7. The jetted material printing system of claim 1, further comprising a recycling system for recycling the removed liquid.

8. The jetted material printing system of claim 1, wherein the liquid removal device and the one or more printheads are located on opposite sides of the carrier substrate.

9. The jetted material printing system of claim 1, wherein the first position includes a position being offset from the carrier substrate, a position downstream from the printheads, or a position substantially beneath at least one of the printheads.

10. A jetted material printing system, comprising:
a carrier substrate configured to travel along a longitudinal direction;
one or more printheads, each of the one or more printheads being configured to deposit an amount of material onto the carrier substrate to form a printed layer;
a liquid removal device located at a first position from the one or more printheads in the longitudinal direction, the liquid removal device being configured to remove a liquid from the printed layer formed onto the carrier substrate; and
a binder conditioning device located at a second position downstream from the liquid removal device in the longitudinal direction, the binder conditioning device being configured to deposit a binder material on the printed layer formed on the carrier substrate after the liquid removal;
wherein the liquid removal device removes an amount of binder material from the printed layer, and wherein the binder conditioning device is configured to add an amount of the binder material to the material deposited onto the carrier substrate in order to restore one or more properties of the deposited material.

11. A method of jetted material printing, the method comprising:
depositing a material from one or more printheads onto a carrier substrate to form a printed layer, the material including at least one of a powder, a solvent, a binder, and one or more additives;
removing at least the solvent from the printed layer via a liquid removal device; and
conditioning the printed layer by depositing an amount of conditioning binder on the printed layer formed on the carrier substrate after the solvent removal via a binder conditioning device;
determining that the binder conditioned printed layer has a sufficient amount of binder so that the binder conditioned printed layer can be transferred in its entirety without breaking; and
upon determining that the binder conditioned printed layer can be transferred in its entirety without breaking, transferring the binder conditioned printed layer.

12. The method of claim 11, wherein depositing the material from the one or more printheads comprises depositing a different material from each of the one or more printheads.

13. The method of claim 11, further comprising using one or more sensors to determine at least one of a quantity and a location of conditioning binder required to restore one or more properties of the printed layer to its state prior to liquid removal.

14. The method of claim 11, further comprising:
determining that the binder conditioned printed layer fails to have a sufficient amount of binder so that the binder conditioned printed layer cannot be transferred in its entirety without breaking, and
upon determining that transferring the binder conditioned printed layer cannot be transferred in its entirety without breaking, disposing of the binder conditioned printed layer.

15. The method of claim 11, wherein depositing the amount of conditioning binder comprises depositing one or more layers of the conditioning binder.

16. The method of claim 11, wherein depositing the amount of conditioning binder comprises replenishing the binder in the printed layer.

17. The method of claim 11, further comprising recycling the removed liquid.

18. The method of claim 11, wherein depositing the amount of conditioning binder comprises depositing a conditioning binder that is different from the binder in at least one of the one or more printheads.

19. The method of claim 11, wherein depositing the material from the one or more printheads comprises depositing the material from one or more inkjet printheads.

20. The method of claim 11, wherein the one or more printheads deposit the amount of material substantially in parallel with the liquid removal device removing liquid from a previously deposited material on the carrier substrate.

21. The method of claim 11, wherein the printed layer comprises a binder, and wherein the conditioning binder deposited on the printed layer formed on the carrier substrate compensates for an amount of binder that has been removed by the liquid removal device.

22. The method of claim 11, wherein the binder conditioning device is configured to add an amount of the conditioning binder to the material deposited onto the carrier substrate in order to replenish one or more properties of the deposited material to preserve quality and integrity of the printed layer.

* * * * *